(12) United States Patent
Ohtsuji

(10) Patent No.: US 11,068,190 B2
(45) Date of Patent: Jul. 20, 2021

(54) STORAGE APPARATUS AND DATA ARRANGEMENT METHOD FOR STORAGE APPARATUS

(71) Applicant: FUJITSU LIMITED, Kawasaki (JP)

(72) Inventor: Hiroki Ohtsuji, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 14 days.

(21) Appl. No.: 16/699,785

(22) Filed: Dec. 2, 2019

(65) Prior Publication Data

US 2020/0225866 A1 Jul. 16, 2020

(30) Foreign Application Priority Data

Jan. 15, 2019 (JP) .............................. JP2019-004406

(51) Int. Cl.
*G06F 3/06* (2006.01)
*G06F 11/20* (2006.01)

(52) U.S. Cl.
CPC .......... *G06F 3/0649* (2013.01); *G06F 3/0613* (2013.01); *G06F 3/0619* (2013.01); *G06F 3/0653* (2013.01); *G06F 3/0683* (2013.01); *G06F 11/2023* (2013.01)

(58) Field of Classification Search
CPC .... G06F 3/0649; G06F 3/0613; G06F 3/0619; G06F 3/0683; G06F 3/0647; G06F 3/0689; G06F 3/0605; G06F 11/2094; G06F 11/2056; G06F 2212/262

See application file for complete search history.

(56) References Cited

U.S. PATENT DOCUMENTS

| | | | |
|---|---|---|---|
| 10,082,965 B1* | 9/2018 | Tamilarasan | G06F 3/0631 |
| 2005/0193167 A1 | 9/2005 | Eguchi et al. | |
| 2007/0067666 A1* | 3/2007 | Ishikawa | G06F 11/1088 714/6.21 |
| 2016/0070628 A1* | 3/2016 | Joshi | G06F 3/0629 714/6.22 |

FOREIGN PATENT DOCUMENTS

| | | |
|---|---|---|
| JP | 10-3412 A | 1/1998 |
| JP | 2006-331458 A | 12/2006 |

* cited by examiner

*Primary Examiner* — Tracy A Warren
(74) *Attorney, Agent, or Firm* — Fujitsu Patent Center

(57) ABSTRACT

A storage apparatus includes a plurality of storage devices, and a processor coupled to the plurality of storage devices and configured to generate, when detecting a failure of a storage device belonging to a first volume that is generated with the plurality of storage devices, a second volume having a remaining operating rate equal to or larger than an access frequency of the first volume and satisfying a required capacity of the first volume, with a storage device in an operating state of the plurality of storage devices, and move data arranged in the first volume to the second volume generated.

9 Claims, 12 Drawing Sheets

FIG. 7
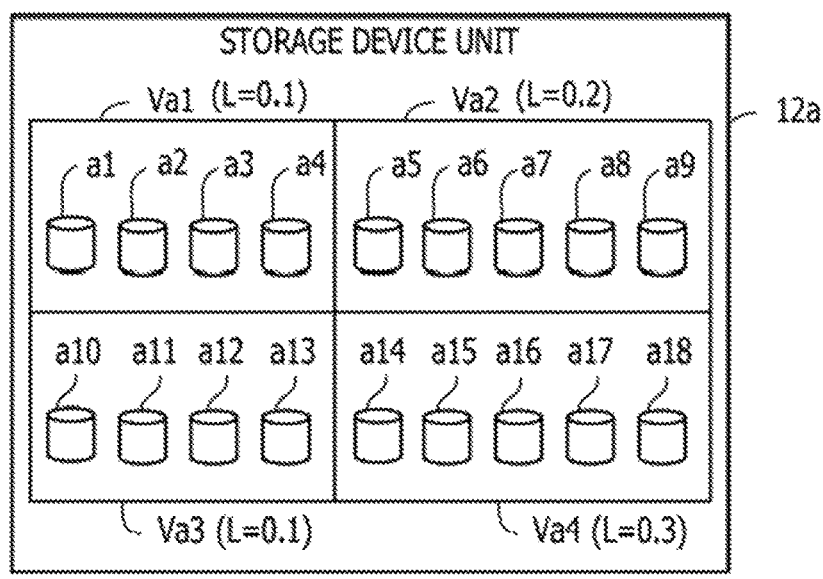
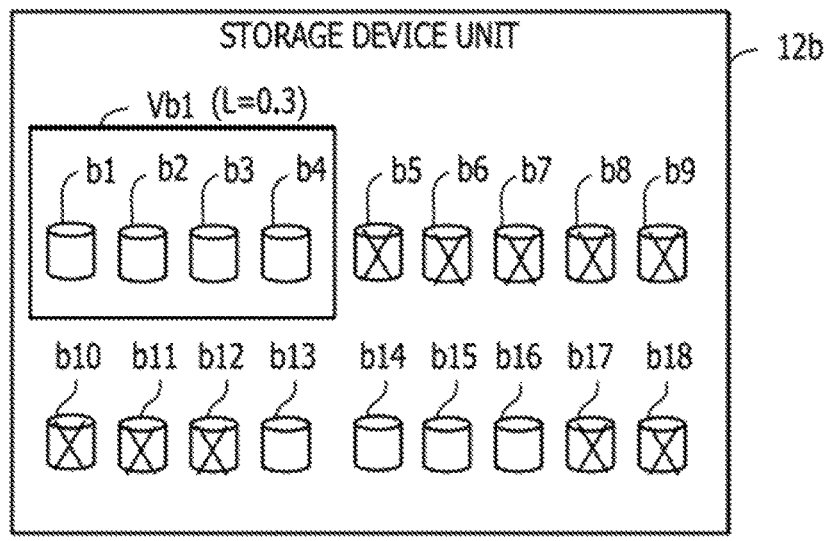
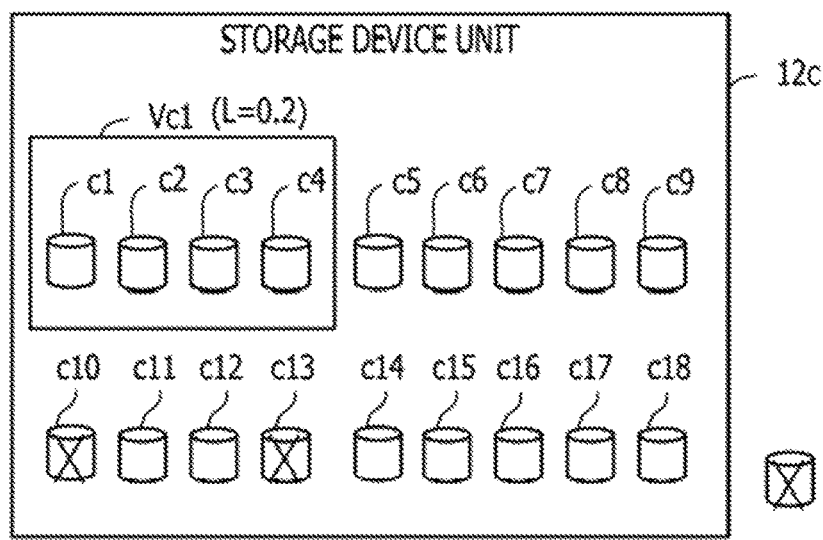

FIG. 8
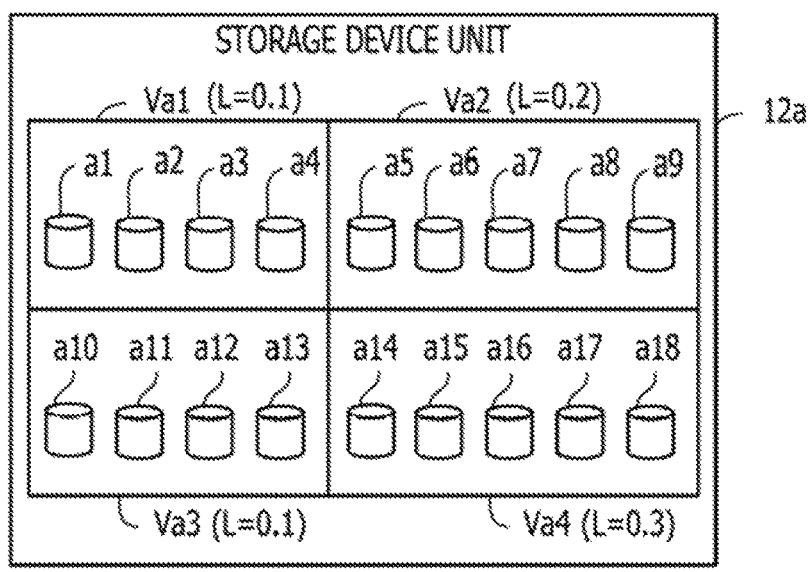
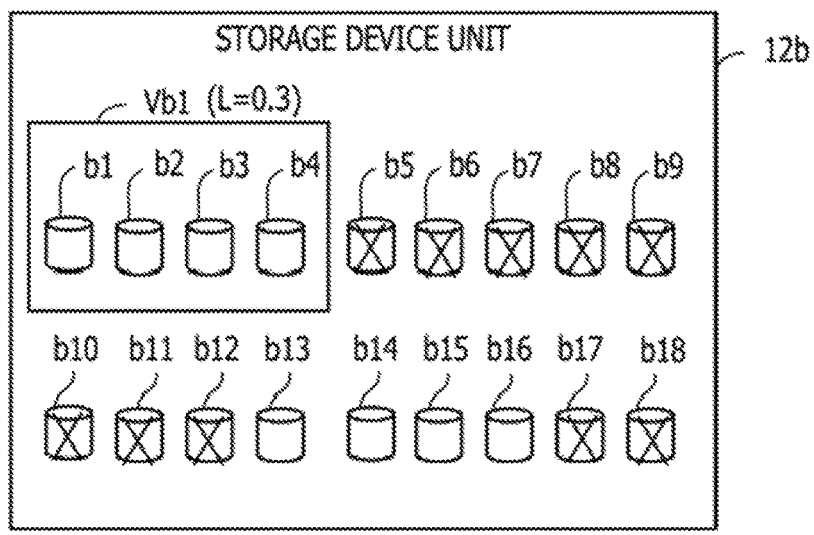
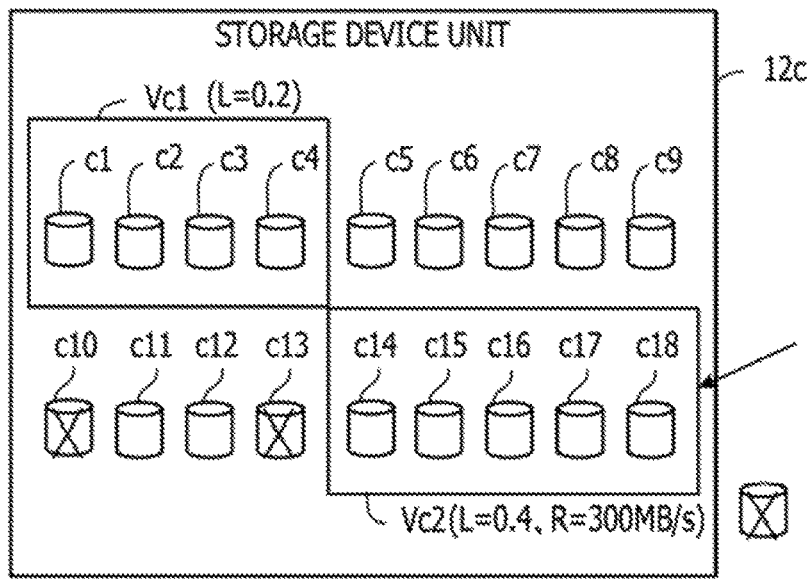

STORAGE APPARATUS AND DATA ARRANGEMENT METHOD FOR STORAGE APPARATUS

CROSS-REFERENCE TO RELATED APPLICATION

This application is based upon and claims the benefit of priority of the prior Japanese Patent Application No. 2019-4406, filed on Jan. 15, 2019, the entire contents of which are incorporated herein by reference.

FIELD

The embodiments discussed herein are related to a storage apparatus and a data arrangement method.

BACKGROUND

Storage apparatus each include a plurality of storage devices, and record and manage a huge amount of data that is handled in information processing. Examples of the storage devices include hard disk drives (HDDs) and solid-state drives (SSDs) faster than HDDs.

In recent years, storage apparatus specialized in recording cold data to be stored for a long time, for example, observation data, have attracted attention.

Such a storage apparatus allows data to be written to the storage apparatus and read out thereof, but does not allow existing data stored in the storage devices to be rewritten. Since cold data is not so often accessed, the storage apparatus has low power consumption and heat generation. Thus, the storage devices may be mounted at a high density, which means that the space may be efficiently utilized.

As related arts of storage apparatus, for example, the following have been proposed: a technology that relocates a plurality of files stored in a magnetic disk from a location near an index area based on the storage order of access frequency information; and a technology that determines an optimum arrangement of data in a logical device, and arranges the data in the logical device based on the determined plan. As the related arts, for example, Japanese Laid-open Patent Publication No. H10-3412 and Japanese Laid-open Patent Publication No. 2006-331458 are disclosed.

A storage apparatus specialized in recording cold data such as the one described above is not designed on the premise of maintenance and replacement of a failed storage device, and even when there is a failed storage device, the storage apparatus continues its operation with still available storage devices. With regard to arrangement (storage) of data in storage devices, a plurality of storage devices form one volume and data is arranged on a volume-to-volume basis.

Thus, when a storage device has failed in a plurality of storage devices forming a volume, the failed storage device is neither maintained nor replaced and the storage apparatus continues its operation with the failed storage device. This leads to a problem that the data loss ratio of data arranged in the volume to which the failed storage device belongs increases. In view of the foregoing, it is desired that a storage apparatus and data arrangement method for achieving a reduction in data loss ratio may be provided.

SUMMARY

According to an aspect of the embodiments, a storage apparatus includes a plurality of storage devices, and a processor coupled to the plurality of storage devices and configured to generate, when detecting a failure of a storage device belonging to a first volume that is generated with the plurality of storage devices, a second volume having a remaining operating rate equal to or larger than an access frequency of the first volume and satisfying a required capacity of the first volume, with a storage device in an operating state of the plurality of storage devices, and move data arranged in the first volume to the second volume generated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of operation of a storage apparatus when receiving a volume generation request to generate a volume;

FIG. 8 is a diagram illustrating an example of operation of a storage apparatus when receiving a volume generation request to generate a volume;

DESCRIPTION OF EMBODIMENTS

Embodiments are now described with reference to the drawings.

First Embodiment

Figure 1:
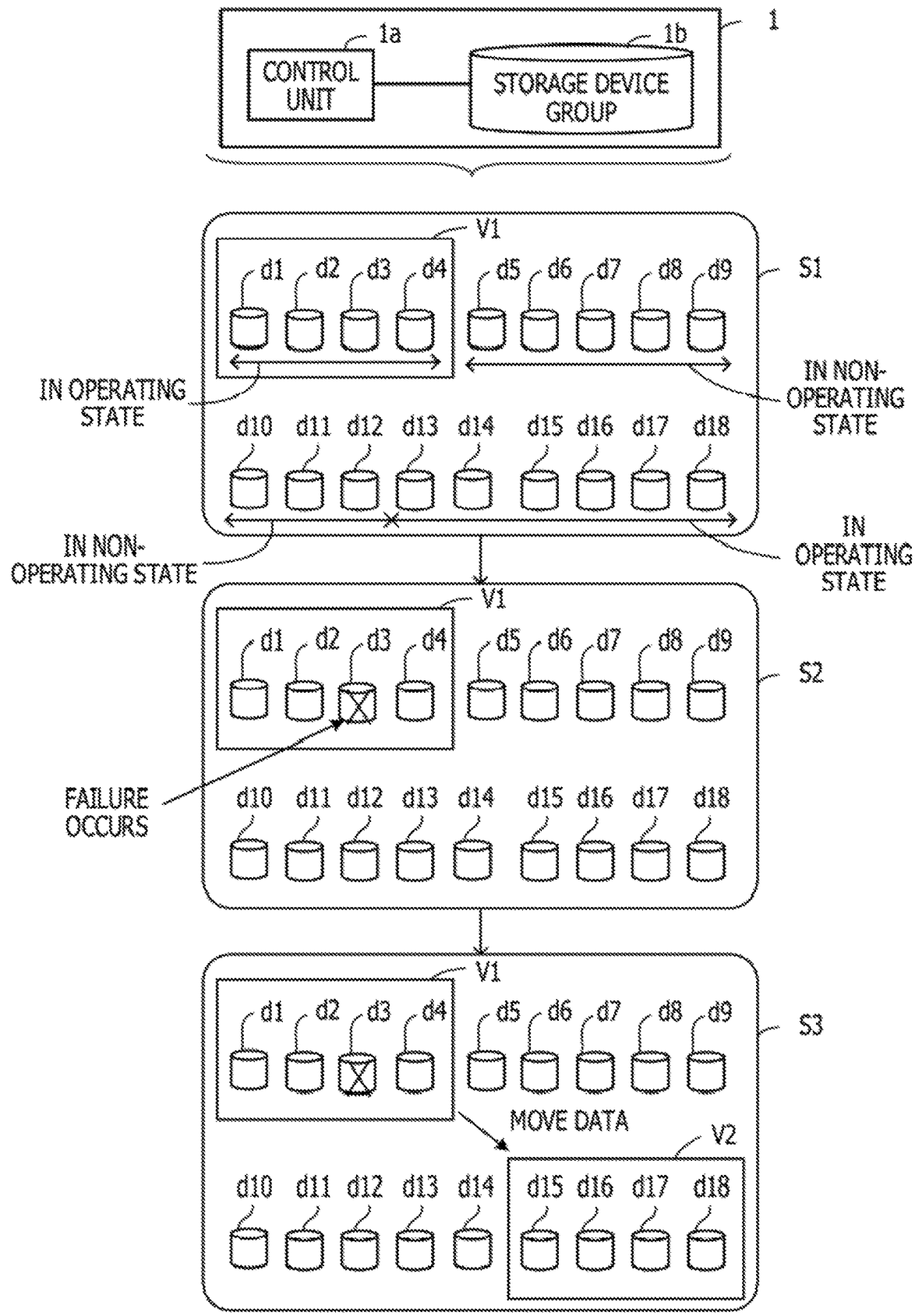
FIG. 1 is a diagram illustrating an example of a storage apparatus.

A first embodiment is described with reference to FIG. 1. FIG. 1 is a diagram illustrating an example of a storage apparatus. A storage apparatus 1 includes a control unit 1a and a storage device group 1b.

The storage device group 1b includes a plurality of storage devices. The control unit 1a generates a first volume with the storage device group 1b and arranges data in the first volume. The control unit 1a monitors operation of the storage devices in the storage device group 1b to detect a failure of a storage device.

It is assumed that a failure of a storage device belonging to the first volume, which is generated with the storage device group 1b, is detected. In this case, the control unit 1a generates a second volume having a remaining operating rate equal to or larger than the access frequency of the first volume and satisfying the required capacity of the first volume, with storage devices in an operating state that are still available in the storage device group. Then, the control unit 1a moves the data arranged in the first volume to the second volume.

The operation is described with the use of the example illustrated in FIG. 1. The storage device group 1b of the storage apparatus 1 includes a plurality of storage devices d1 to d18. It is assumed that, of the storage devices d1 to d18, the storage devices d1 to d4 and the storage devices d13 to d18 are in the operating state while the storage devices d5 to d12 are in a non-operating state.

[Step S1] The control unit 1a generates a volume V1 with the storage devices d1 to d4 of the storage devices d1 to d18, and arranges data in the volume V1.

[Step S2] It is assumed that the control unit 1a detects a failure of the storage device d3 belonging to the volume V1. In this case, the control unit 1a searches the storage devices d13 to d18 in the operating state, which are still available, for storage devices capable of forming a volume having a remaining operating rate equal to or larger than the access frequency of the volume V1 and satisfying the required capacity of the volume V1 (the contents of conditions for the search are described later).

[Step S3] When the control unit is determines that, of the storage devices d13 to d18 in the operating state, a volume that is generated with the storage devices d15 to d18 satisfies the above-mentioned conditions, the control unit is generates a volume V2 to which the storage devices d15 to d18 belong. Then, the control unit is moves (copies) the data arranged in the volume V1 to the volume V2.

In this way, in the storage apparatus 1, when there is a failed storage device belonging to a first volume, a second volume satisfying the access frequency and required capacity of the first volume is generated with still available storage devices in the operating state, and data is moved from the first volume to the second volume. With this, the storage apparatus 1 may reduce a data loss ratio even when there is a failed storage device.

Second Embodiment

A second embodiment is described next. A storage apparatus of the second embodiment is, for example, an apparatus configured to record cold data and continue, even when there is a failed storage device, its operation with still available storage devices without maintenance and replacement of the failed storage device. The system configuration is first described.

Figure 2:
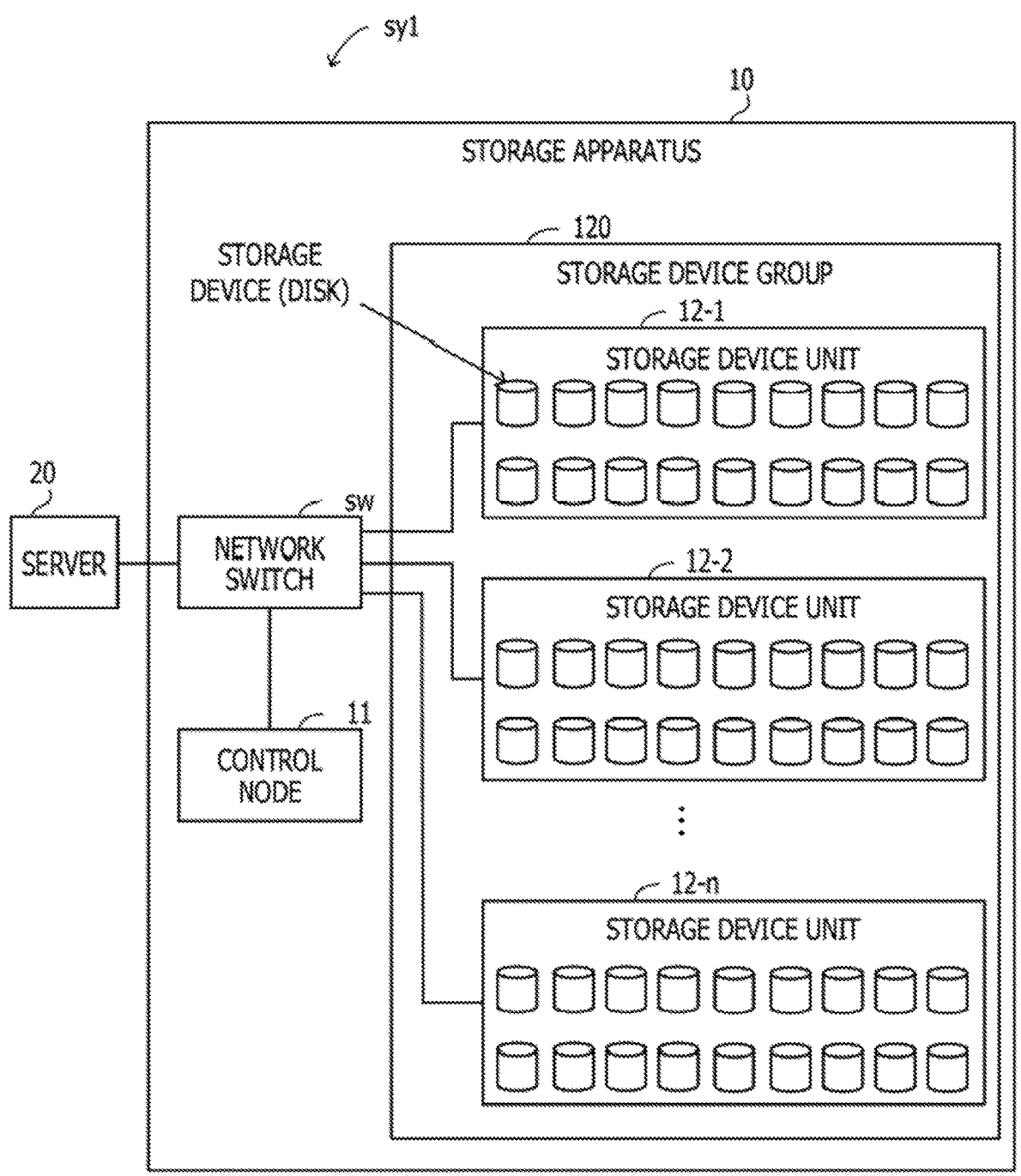
FIG. 2 is a diagram illustrating an example of a configuration of a storage system.

FIG. 2 is a diagram illustrating an example of a configuration of a storage system. A storage system sy1 includes a server 20 and a storage apparatus 10.

The storage apparatus 10 includes a network switch sw, a control node 11, and a storage device group 120. The storage device group 120 includes storage device units 12-1 to 12-n (collectively referred to as "storage device unit 12").

The storage device unit 12 includes a plurality of storage devices (disks). The control node 11 achieves the function of the control unit 1a in FIG. 1, and the storage device group 120 achieves the function of the storage device group 1b in FIG. 1.

To the network switch sw, the server 20, the control node 11, and the storage device group 120 are coupled.

The control node 11 accesses a given storage device unit 12 through the network switch sw based on an instruction from the server 20, which is an access source, to thereby perform input-output (I/O) control of the storage device unit 12, for example.

In the storage device unit 12, the storage devices have redundancy. Redundant Arrays of Inexpensive Disks (RAID) 6 is applied to the storage device unit 12, for example. The RAID 6 is a disk array mechanism having double parity in which two kinds of parity are arranged in different storage devices and providing fault tolerance up to two failed storage devices in the same RAID group. RAID is applied to each volume generated in the storage device unit 12.

It is assumed that the number of storage devices in the storage device unit 12 is N. In the storage device unit 12, since the storage devices are mounted at a high density, all the storage devices do not simultaneously operate due to restrictions such as power supply and heat dissipation. It is assumed that the number of storage devices of the plurality of storage devices in the storage device unit 12 that may simultaneously operate is P. It is assumed that the number of storage devices that have failed and are thus not operating of the plurality of storage devices in the storage device unit 12 is F (failed storage devices are not supplied with current).

A real operating rate Rc of the storage device unit 12 is calculated by Expression (1) below.

$$Rc=P/(N-F) \quad (1)$$

From Expression (1), as the number of failed storage devices increases, more still available storage devices operate.

<Hardware>

Figure 3:
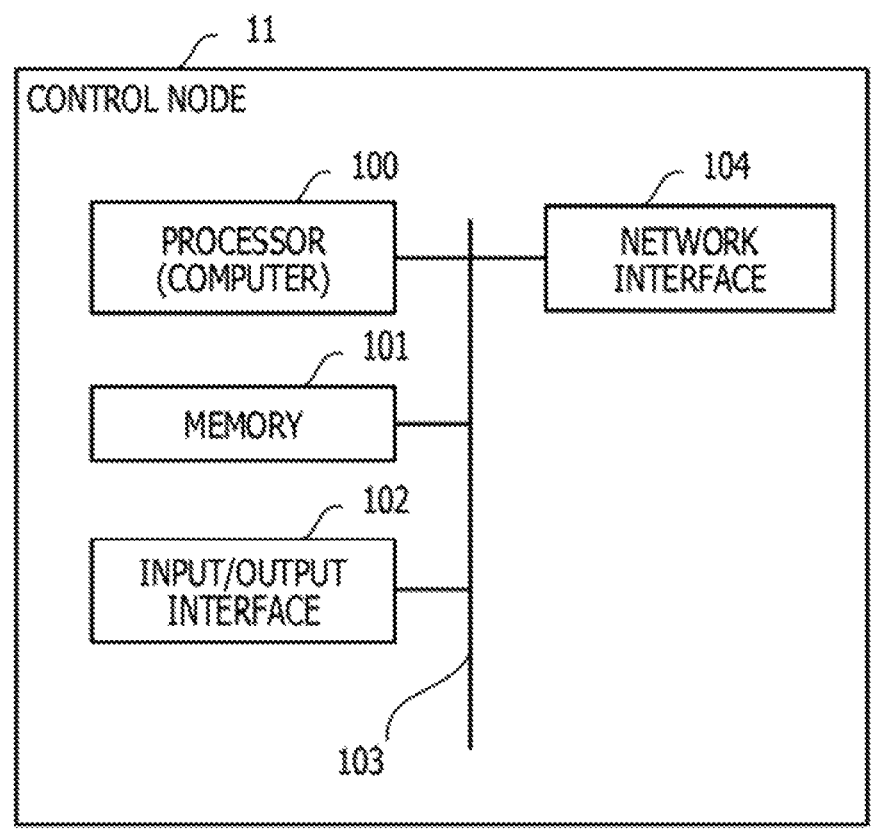
FIG. 3 is a diagram illustrating an example of a hardware configuration of a control node.

FIG. 3 is a diagram illustrating an example of a hardware configuration of a control node. The control node 11 is entirely controlled by a processor (computer) 100.

To the processor 100, a memory 101 and a plurality of peripherals are coupled via a bus 103. The processor 100 may be a multiprocessor. The processor 100 may be, for example, a central processing unit (CPU), a micro processing unit (MPU), a digital signal processor (DSP), an application specific integrated circuit (ASIC), or a programmable logic device (PLD). The processor 100 may be a combination of two or more elements of the CPU, MPU, DSP, ASIC, and PLD.

The memory 101 is used as a main storage device of the control node 11. The memory 101 at least partly stores a program for an operating system (OS) that the processor 100 is to execute and an application program temporarily. The memory 101 stores various data required for processing by the processor 100.

The memory 101 is also used as an auxiliary storage device of the control node 11, and stores an OS program, an application program, and various data. The memory 101 may include, as the auxiliary storage device, a semiconductor storage device such as a flash memory or an SSD or a magnetic recording medium such as an HDD.

The peripherals coupled to the bus 103 include an input/output interface 102 and a network interface 104. To the input/output interface 102, maintenance terminals may be coupled.

To the input/output interface 102, a monitor (for example, a light emitting diode (LED) or a liquid crystal display (LCD)) is coupled. The monitor functions as a display apparatus configured to display the state of the control node 11 in response to an instruction from the processor 100.

To the input/output interface 102, an information input apparatus such as a keyboard or a mouse may be coupled, and the input/output interface 102 transmits signals that are sent from the information input apparatus to the processor 100.

The input/output interface 102 also functions as a communication interface for coupling with peripherals. For example, to the input/output interface 102, an optical drive apparatus configured to read data recorded on an optical disc by using laser light may be coupled. Examples of the optical disc include Blu-ray discs (registered trademark), compact disc read only memories (CD-ROMs), CD recordables (CD-Rs), and CD rewritables (CD-RWs).

To the input/output interface 102, a memory apparatus or a memory reader/writer may be coupled. The memory apparatus is a recording medium having the function of communication with the input/output interface 102. The memory reader/writer is an apparatus configured to write data to a memory card or read out data from the memory card. The memory card is a card-like recording medium.

The network interface 104 performs communication interface control of a network through the network switch sw. A network interface card (NIC) or a wireless local area network (LAN) card may be used, for example. Data received by the network interface 104 is output to the memory 101 or the processor 100.

With the hardware configuration as described above, the processing function of the control node 11 may be achieved. For example, the control node 11 may perform the storage control of the embodiment with the processor 100 executing given programs.

The control node 11 executes the programs recorded on a computer-readable recording medium, for example, to thereby achieve the processing function of the embodiment. The programs having described therein processing details that the control node 11 is to execute may be recorded on various recording media.

For example, the programs that the control node 11 is to execute may be stored in the auxiliary storage device. The processor 100 loads at least a part of the programs in the auxiliary storage device into the main storage device, to thereby execute the programs.

The programs may be recorded on a portable recording medium such as an optical disc, a memory apparatus, or a memory card. The programs stored in the portable recording medium are installed on the auxiliary storage device under control by the processor 100, for example, to thereby be executable. The processor 100 may directly read out the programs from the portable recording medium to execute the programs.

<Flow Chart>

The operation in the following cases is next described with reference to the flow charts of FIG. 4 to FIG. 6: when there is a volume generation request; when there is a failed storage device; and when there is an added storage device unit.

Figure 4:
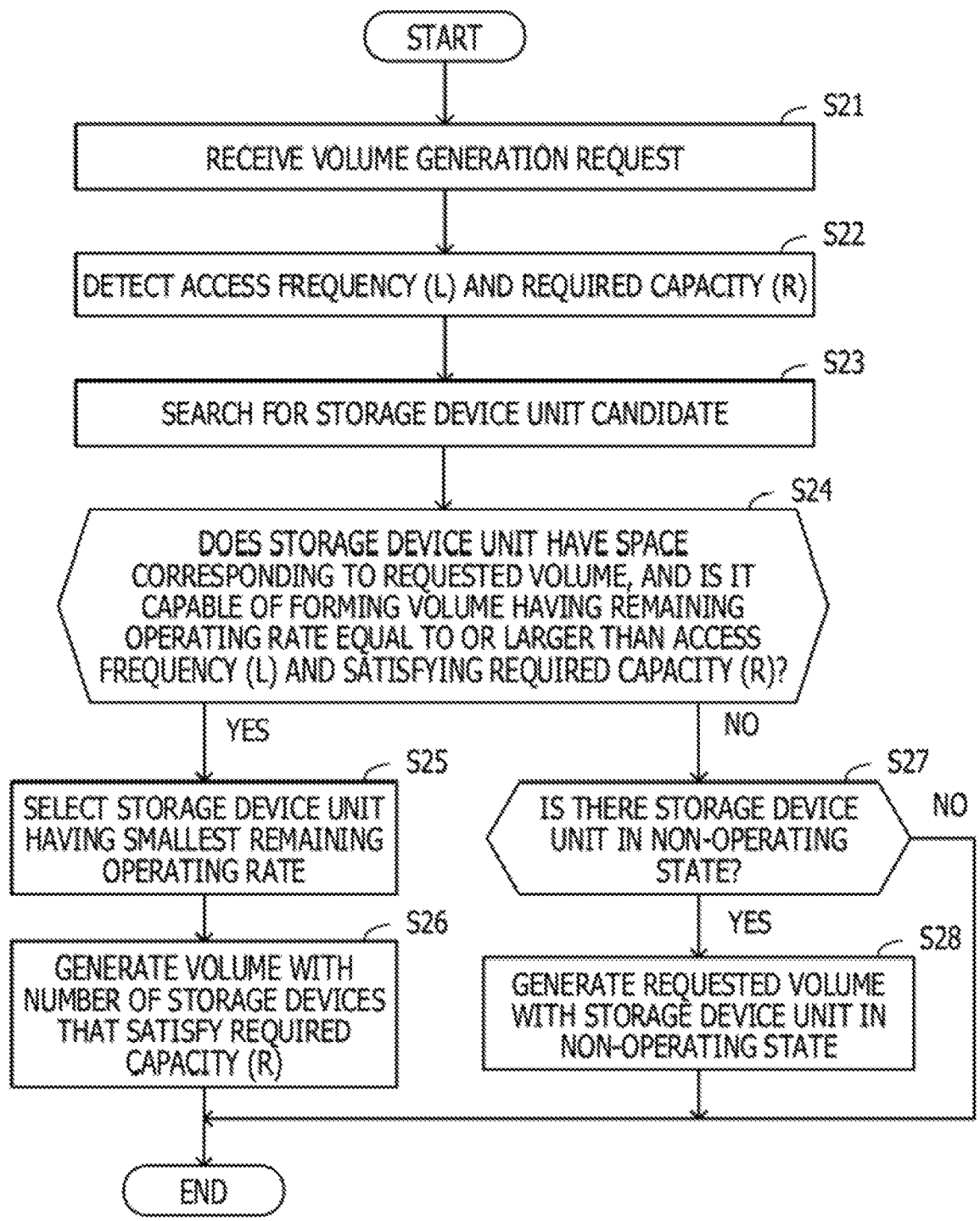
FIG. 4 is a flow chart illustrating an example of operation of a storage apparatus when there is a volume generation request.

FIG. 4 is a flow chart illustrating an example of operation of a storage apparatus when there is a volume generation request.

[Step S21] The control node 11 receives a volume generation request transmitted from, for example, a maintenance terminal coupled to the server 20 or the storage apparatus 10.

[Step S22] The control node 11 detects the access frequency (L) and required capacity (R) of a requested volume.

The access frequency (L) is an index indicating how many storage devices of a plurality of storage devices belonging to a volume simultaneously operate per unit time. For example, in a case where 10 storage devices belong to one volume and five of the storage devices simultaneously operate, the access frequency is represented as 0.5 or 50%.

The required capacity (R) is an index indicating volume read-out throughput T [MB/s], and takes a value obtained by multiplying, to the number of storage devices to which data is written through striping, read-out throughput when the data is read out from the storage devices.

For example, in a case where N storage devices are used with the RAID 6, since data is written to N−2 storage devices through striping (remaining two storage devices are for parity), the required capacity (R) in this case is calculated as (N−2)×T[MB/s].

[Step S23] The control node 11 searches a plurality of storage device units currently operating for a storage device unit candidate capable of generating the requested volume.

[Step S24] The control node 11 searches for a storage device unit candidate satisfying the following conditions: having space corresponding to the requested volume, and being capable of forming a volume having a remaining operating rate equal to or larger than the access frequency (L) and satisfying the required capacity (R). In a case where there is a storage device unit candidate satisfying the conditions, the processing proceeds to Step S25, whereas in a case where there is no storage device unit candidate satisfying the conditions, the processing proceeds to Step S27.

An apparatus operating rate and the remaining operating rate are now described. The apparatus operating rate is a total value of the access frequencies (L) of volumes. For example, in a case where three volumes are generated in a storage device unit and the access frequencies (L) of the volumes are 1%, 2%, and 3%, the apparatus operating rate of this storage device unit is 6% (=1%+2%+3%).

The remaining operating rate is a value obtained by subtracting the apparatus operating rate from the real operating rate. For example, in a case where one storage device unit has a real operating rate of 20% and an apparatus operating rate of 6%, the remaining operating rate is 14% (=20%−6%).

[Step S25] In a case where there are a plurality of storage device unit candidates satisfying the above-mentioned conditions, the control node 11 selects one of the plurality of storage device unit candidates that has the smallest remaining operating rate. Selecting a storage device unit having the smallest remaining operating rate increases the possibility that when a generation request for a volume is newly received, the volume may be generated with a still available storage device unit.

[Step S26] The control node 11 generates a volume using the number of storage devices in the selected storage device unit that satisfy the required capacity (R).

[Step S27] The control node 11 determines whether or not there is a storage device unit in the non-operating state (not in use), which is not currently operating. In a case where there is a storage device unit in the non-operating state, the processing proceeds to Step S28, whereas in a case where there is no storage device unit in the non-operating state, it is determined that it is difficult to generate a volume and the processing ends.

[Step S28] The control node 11 generates a volume with the storage device unit in the non-operating state.

As described above, since a new volume is generated with storage devices in the operating state, still available storage devices (still available drives) may be effectively utilized.

With the storage apparatus capable of being used until almost all the operation drives fail, the facility utilization efficiency may be enhanced.

Figure 5:
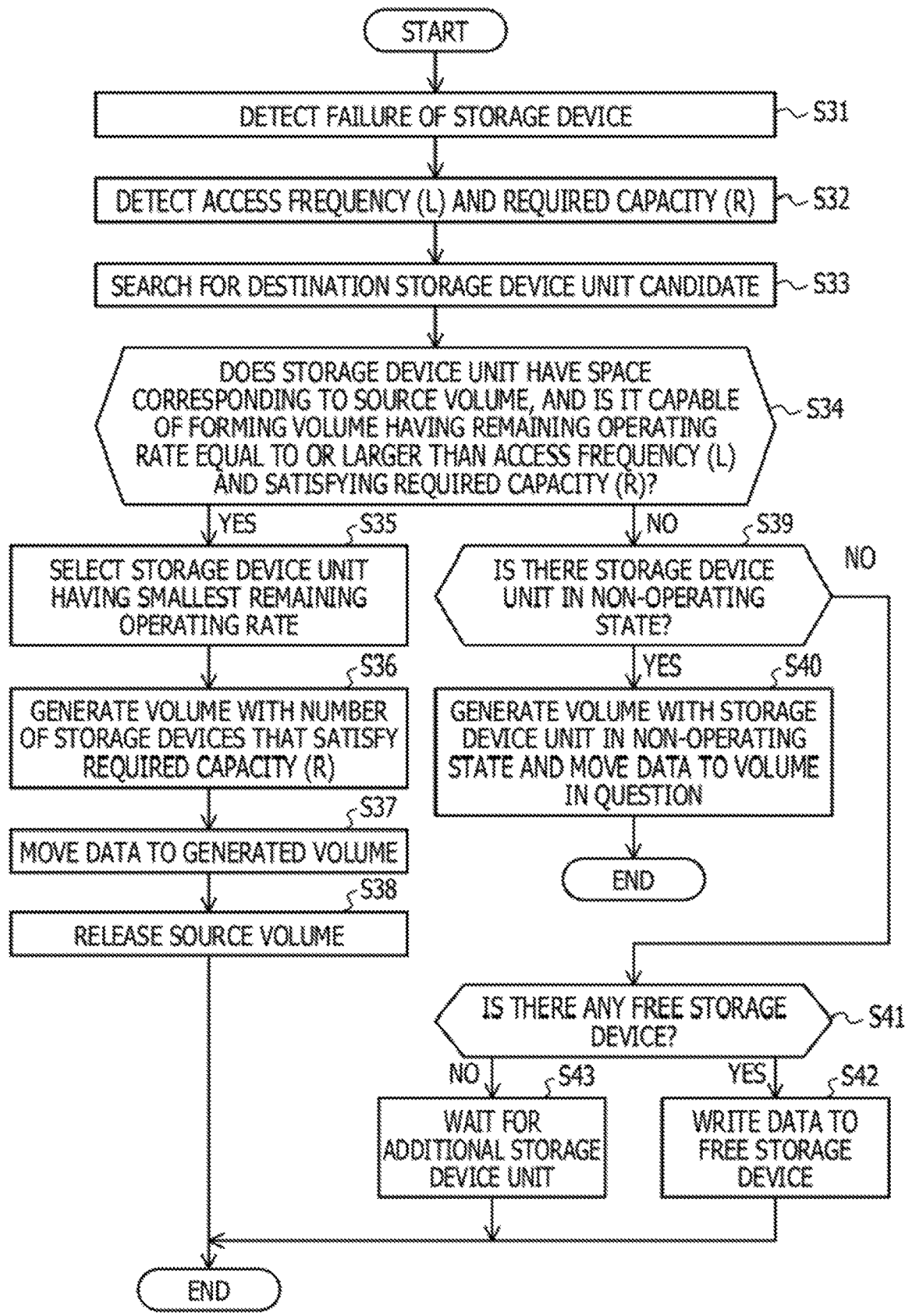
FIG. 5 is a flow chart illustrating an example of operation of a storage apparatus when there is a failed storage device.

FIG. 5 is a flow chart illustrating an example of operation of a storage apparatus when there is a failed storage device.

[Step S31] The control node 11 detects a failed storage device of the plurality of storage devices in the storage device unit 12 (failed storage device detection).

[Step S32] The control node 11 detects the access frequency (L) and required capacity (R) of a volume to which the failed storage device belongs.

[Step S33] The control node 11 searches a plurality of storage device units currently operating for a destination storage device unit candidate that is a candidate to which data that has been processed in the volume to which the failed storage device belongs is moved.

[Step S34] The control node 11 searches for a destination storage device unit candidate satisfying the following conditions: having space corresponding to the source volume to which the failed storage device belongs, and being capable of forming a volume having a remaining operating rate equal to or larger than the access frequency (L) and satisfying the required capacity (R). In a case where there is a destination storage device unit candidate, the processing proceeds to Step S35, whereas in a case where there is no destination storage device unit candidate, the processing proceeds to Step S39.

[Step S35] In a case where there are a plurality of destination storage device unit candidates satisfying the above-mentioned conditions, the control node 11 selects a storage device unit having the smallest remaining operating rate.

[Step S36] The control node 11 generates a volume using the number of storage devices in the selected storage device unit that satisfy the required capacity (R).

[Step S37] The control node 11 moves the data arranged in the volume including the failed storage device to the new volume generated in Step S36.

[Step S38] The control node 11 releases the source volume including the failed storage device.

[Step S39] The control node 11 determines whether there is a storage device unit in the non-operating state, which is not currently operating. In a case where there is a storage device unit in the non-operating state, the processing proceeds to Step S40, whereas in a case where there is no storage device unit in the non-operating state, the processing proceeds to Step S41.

[Step S40] The control node 11 generates a volume with the storage device unit in the non-operating state, and moves the data arranged in the volume including the failed storage device to the generated volume.

[Step S41] The control node 11 determines whether or not there is any free storage device (free storage area in storage device unit) or not. In a case where there is a free storage device, the processing proceeds to Step S42, whereas in a case where there is no free storage device, the processing proceeds to Step S43.

[Step S42] The control node 11 uses the free storage device instead of the failed storage device to write data arranged in the storage area of the failed storage device to the free storage device, to thereby distribute the data.

For example, it is assumed that in a storage device unit A, a volume is generated with storage devices A1, A2, and A3 and the storage device A3 has failed. It is assumed that a storage device B1 in a storage device unit B is a free storage device.

In this case, when the storage device B1 is available as a substitute of the storage device A3, data in the volume in question is distributed with the use of the storage devices A1 and A2 in the storage device unit A and the storage device B1 in the storage device unit B.

Since operation with distributed data may lead to a reduction in function, the control node 11 may make, when there is saved data (when data is distributed over a plurality of storage device units), for example, an alarm notification for prompting storage device reconfiguration.

[Step S43] The control node 11 enters a state of waiting for an additional storage device unit. In this case, the control node 11 may issue, for example, an alarm representing a request for an additional storage device unit.

Figure 6:
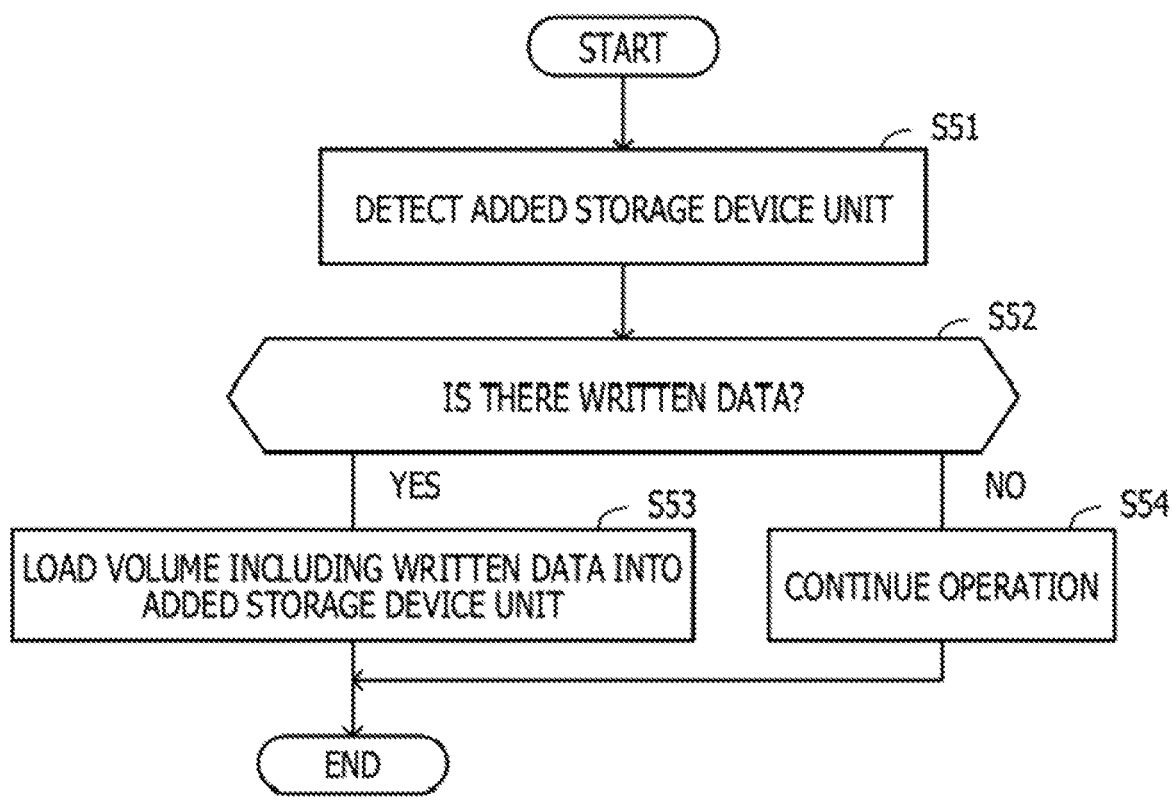
FIG. 6 is a flow chart illustrating an example of operation of a storage apparatus when there is an added storage device unit.
Figure 9:
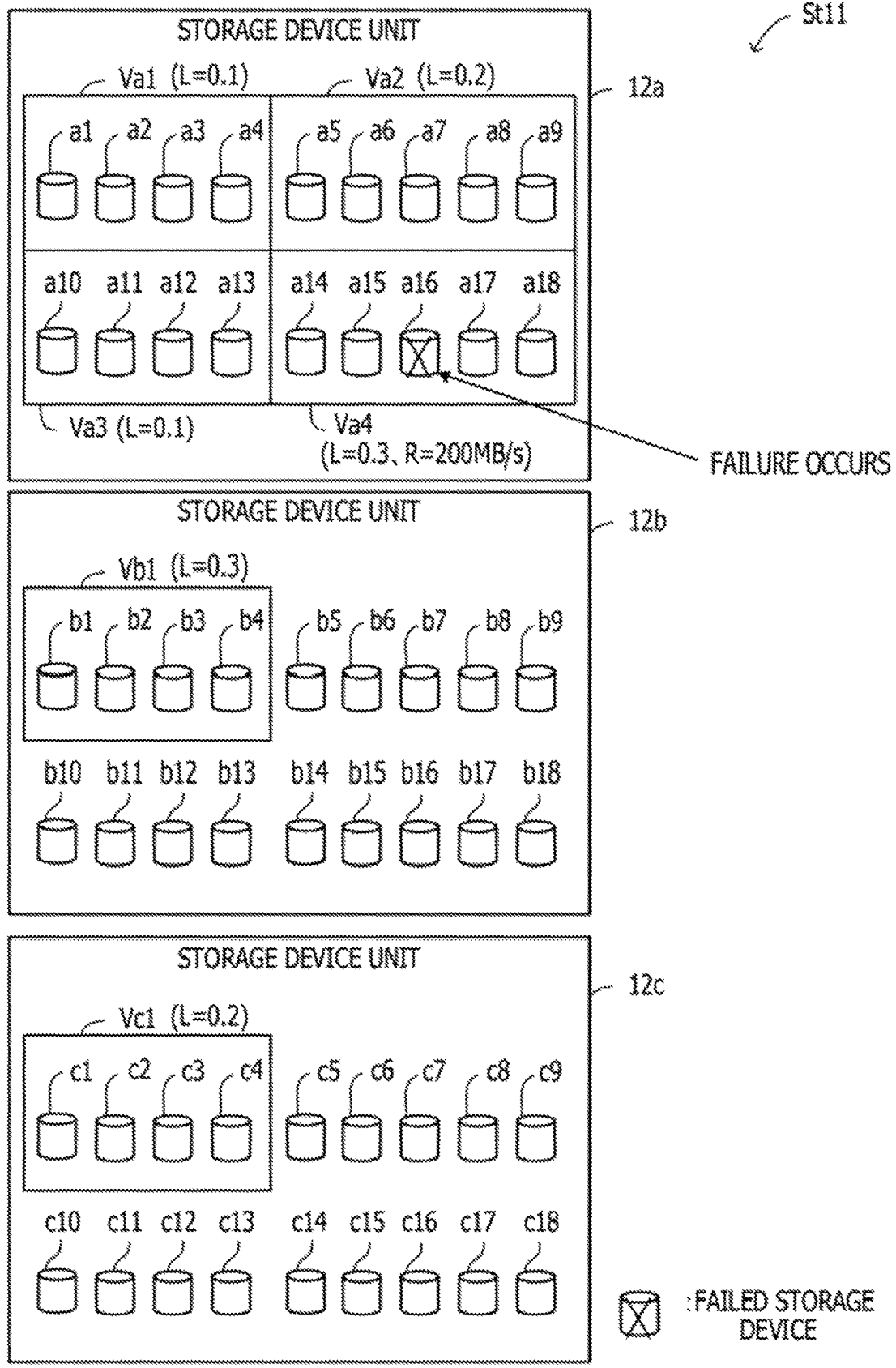
FIG. 9 is a diagram illustrating an example of operation of a storage apparatus when there is a failed storage device.
Figure 10:
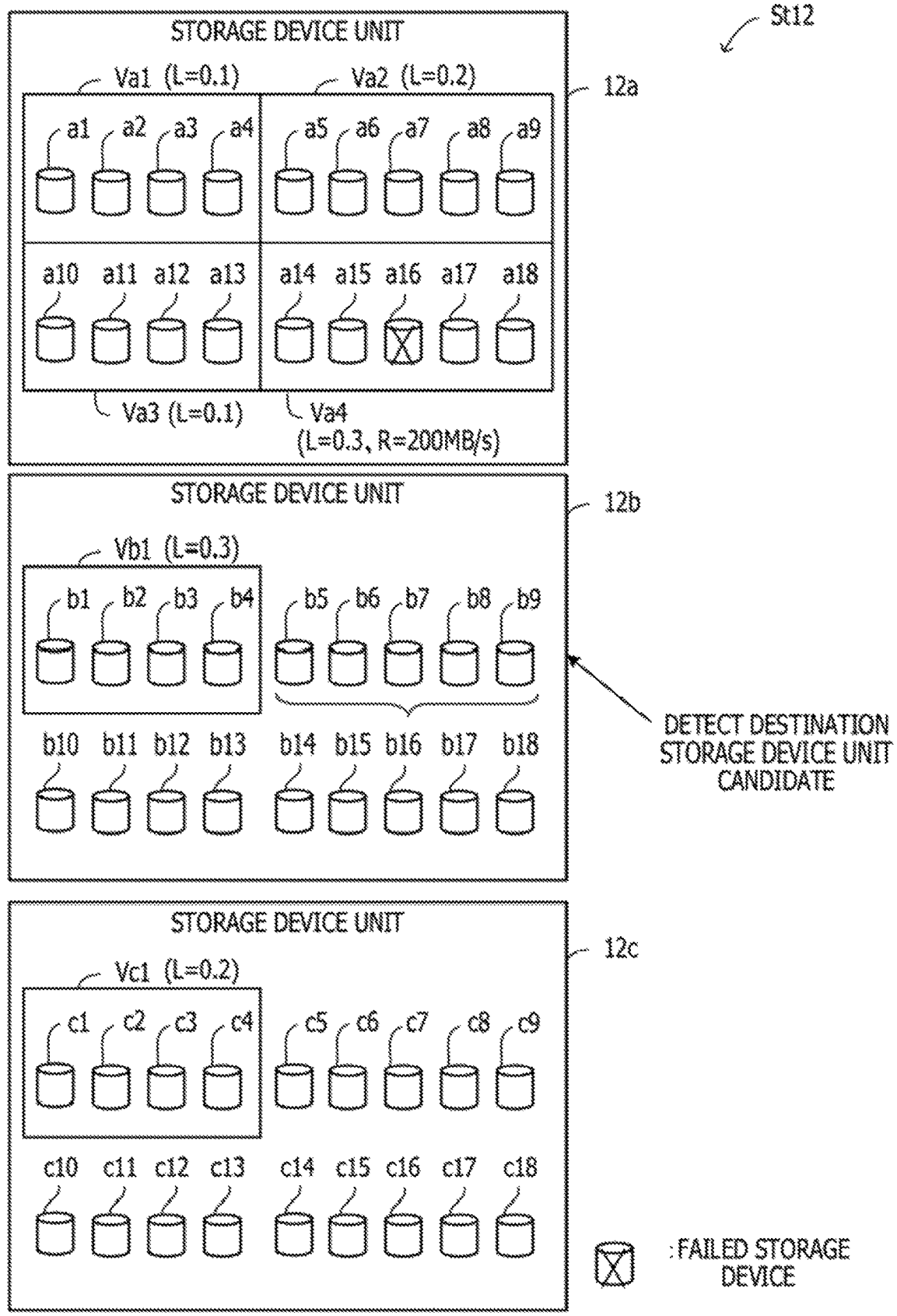
FIG. 10 is a diagram illustrating an example of operation of a storage apparatus when there is a failed storage device.
Figure 11:
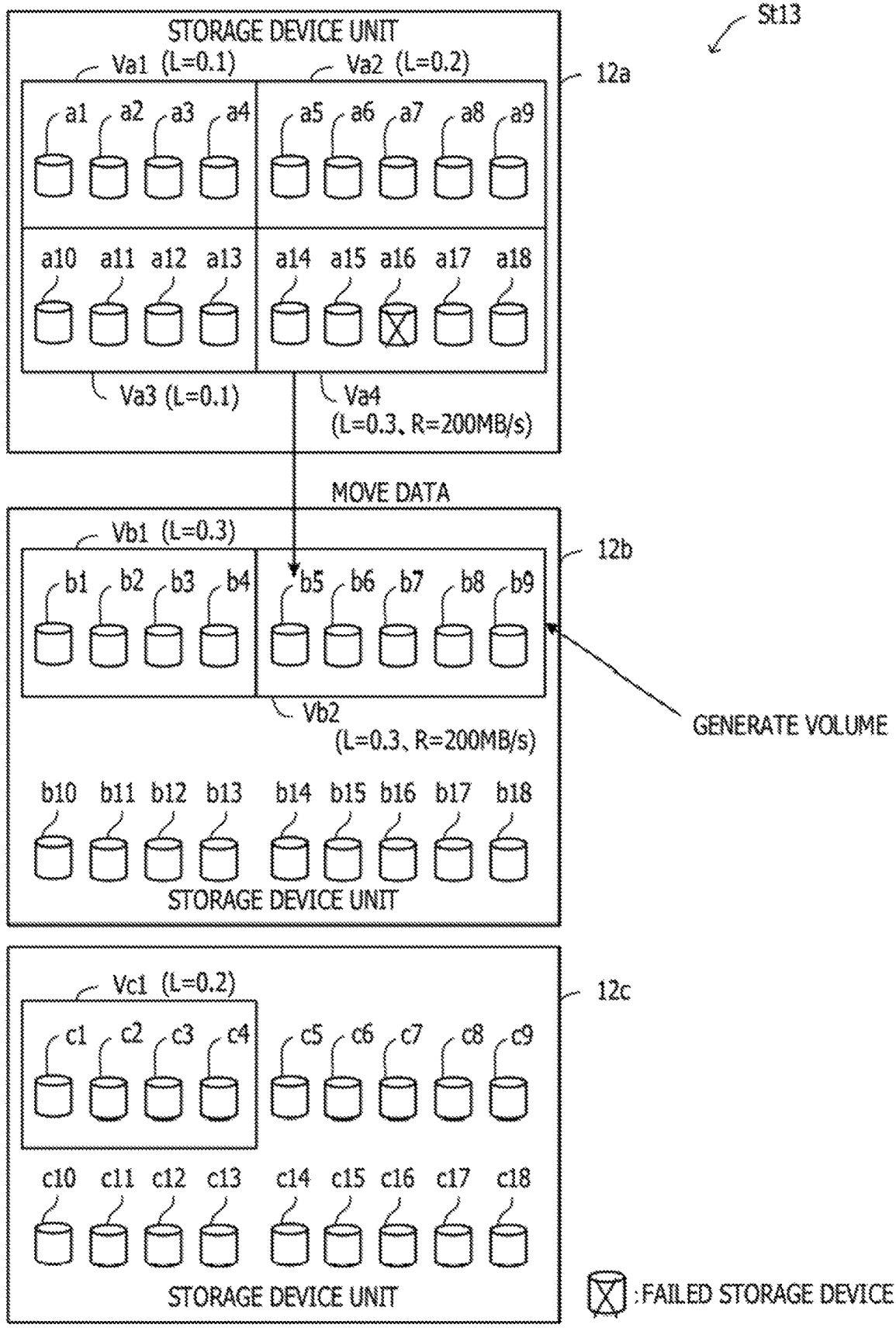
FIG. 11 is a diagram illustrating an example of operation of a storage apparatus when there is a failed storage device.
Figure 12:
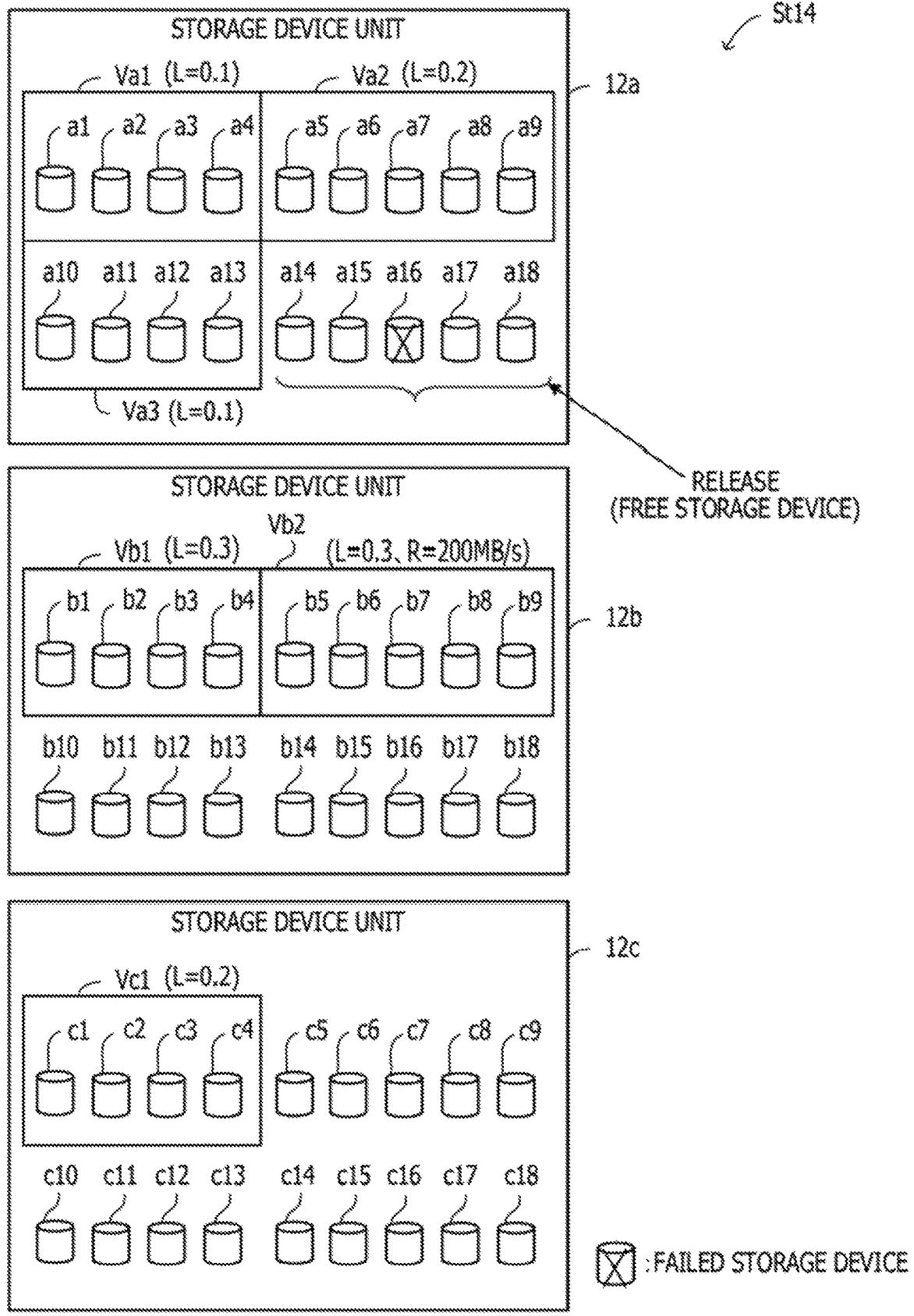
FIG. 12 is a diagram illustrating an example of operation of a storage apparatus when there is a failed storage device.

FIG. 6 is a flow chart illustrating an example of operation of a storage apparatus when there is an added storage device unit.

[Step S51] The control node 11 detects a storage device unit added by a maintenance person.

[Step S52] The control node 11 determines whether there is saved data or not. In a case where there is saved data, the processing proceeds to Step S53, whereas in a case where there is no saved data, the processing proceeds to Step S54.

[Step S53] The control node 11 loads a volume including the saved data into the added storage device unit. A storage device in which the saved data has been arranged is released to return to an original free storage device.

[Step S54] The control node 11 continues its operation (there is no special processing due to the added storage device unit).

<Operation Example>

Specific examples of operation are described next with reference to FIG. 7 to FIG. 12. In the following description, it is assumed that each storage device has a capacity of 100 MB/s and RAID 6 is applied. Two storage devices are thus used for storing parity. For example, in a case where there are six storage devices, since two of the storage devices are used for storing parity, the storage devices substantially have a capacity of 400 MB/s.

FIG. 7 and FIG. 8 are each a diagram illustrating an example of operation of the storage apparatus when receiving a volume generation request to generate a volume.

[State St1] A storage device unit 12a includes storage devices a1 to a18. In the storage device unit 12a, volumes Va1, Va2, Va3, and Va4 are generated. The volume Va1 has L=0.1, and the storage devices a1 to a4 belong to the volume Va1. The volume Va2 has L=0.2, and the storage devices a5 to a9 belong to the volume Va2.

The volume Va3 has L=0.1, and the storage devices a10 to a13 belong to the volume Va3. The volume Va4 has L=0.3, and the storage devices a14 to a18 belong to the volume Va4.

A storage device unit 12b includes storage devices b1 to b18. In the storage device unit 12b, a volume Vb1 is generated. The volume Vb1 has L=0.3, and the storage devices b1 to b4 belong to the volume Vb1. It is assumed that the storage devices b5 to b12 and the storage devices b17 and b18 do not satisfy R=300 MB/s.

A storage device unit 12c includes storage devices c1 to c18. In the storage device unit 12c, a volume Vc1 is generated. The volume Vc1 has L=0.2, and the storage devices c1 to c4 belong to the volume Vc1. It is assumed that the storage devices c10 and c13 do not satisfy R=300 MB/s.

[State St2] It is assumed that the control node 11 receives a new generation request for a volume having an access frequency (L) of 0.4 and a required capacity (R) of 300 MB/s.

It is assumed that the control node 11 detects that the storage devices c14 to c18 in the storage device unit 12c satisfy the request (L=0.4 and R=300 MB/s). In this case, the control node 11 generates a volume Vc2 to which the storage devices c14 to c18 belong in the storage device unit 12c.

FIG. 9 to FIG. 12 are each a diagram illustrating an example of operation of a storage apparatus when there is a failed storage device.

[State St11] It is assumed that in the storage device units 12a, 12b, and 12c, which are the storage device units 12a, 12b, and 12c in State St1 described above, the storage device a16 in the storage device unit 12a has failed. It is assumed that the volume Va4 to which the storage device a16 belongs has L=0.3 and R=200 MB/s.

[State St12] The control node 11 searches the storage device units 12b and 12c for a destination storage device unit candidate satisfying the following conditions: having space corresponding to a volume to which the failed storage device belongs, and being capable of forming a volume having a remaining operating rate equal to or larger than the access frequency (L) and satisfying the required capacity (R). It is assumed that the control node 11 detects that the storage device unit 12b satisfies the conditions.

[State St13] The control node 11 uses the storage devices b5 to b9 of the storage devices in the storage device unit 12b to generate a volume Vb2 that is a destination volume. Then, the control node 11 moves data in the volume Va4 to the volume Vb2.

[State St14] The control node 11 releases the storage devices a14, a15, a17, and a18 belonging to the volume Va4 to return the storage devices a14, a15, a17, and a18 to free storage devices.

As described above, with the control of moving, in a storage apparatus not designed on the premise of maintenance and replacement of a failed storage device, data arranged in a volume (RAID set) having failure to a newly generated volume, a reduction in data loss ratio may be achieved.

With this control, storage apparatus may still be designed on the premise that maintenance and replacement are not performed, and hence the manufacturing cost may be reduced while high density mounting is maintained.

Even when there is a failed storage device, data is relocated from a volume to which the failed storage device belongs to a newly generated volume. Thus, in a storage, the number of hot areas having a high read-out frequency increases, with the result that a system may be configured by the same apparatus without a storage for providing hot areas.

In the example described above, the function of the embodiment is applied to an apparatus configured to record cold data and continue, even when there is a failed storage device, its operation with still available storage devices without maintenance and replacement of the failed storage device. The function of the embodiment is, however, applicable to an apparatus configured record normal data in addition to cold data, or an apparatus designed in consideration of maintenance and replacement.

The processing functions of the storage apparatus 1 and 10 of the embodiment described above may be achieved by a computer. In this case, a program having described therein the processing details of the function that the storage apparatus 1 or 10 is to have is provided. With the program being executed by the computer, the above-mentioned processing function is achieved on the computer.

The program having the processing details described therein may be recorded on a computer-readable recording medium. Examples of the computer-readable recording medium include magnetic storage devices, optical discs, magneto-optical recording media, and semiconductor memories. Examples of the magnetic storage devices include HDDs, flexible disks (FDs), and magnetic tapes. Examples of the optical discs include digital versatile discs (DVDs), DVD-RAMs, CD-ROMs, and CD-RWs. Examples of the magneto-optical recording media include magneto optical disks (MOs).

To distribute the program, for example, portable recording media, such as DVDs or CD-ROMs, having the program recorded thereon are sold. Alternatively, the program may be stored in a storage device of a server computer, and the program may be transferred from the server computer to another computer via a network.

The computer configured to execute the program stores, in its own storage device, the program recorded on the portable recording medium or the program transferred from the server computer, for example. Then, the computer reads the program from its own storage device to execute processing based on the program. The computer may directly read the program from the portable recording medium to execute the processing based on the program.

The computer may execute, every time the program is transferred from the server computer, which is coupled thereto via the network, the processing based on the received program. At least part of the above-mentioned processing function may be achieved by an electronic circuit such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage apparatus, comprising:
a plurality of storage devices that include a plurality of first storage devices that form a first volume; and
a processor coupled to the plurality of storage devices and configured to:
detect that a failure storage device has occurred from among the plurality of first storage devices;
acquire an operating ratio for the first volume, the operating ratio indicating a percentage of storage devices operating simultaneously per unit time;
acquire a required performance indicating a read-out throughput of the plurality of first storage devices;
extract a plurality of second storage devices that has a remaining operating ratio which is equal to or more than the acquired operating ratio and satisfy the required performance, from the plurality of storage devices to generate a second volume to which the plurality of second storage devices belong; and
move data arranged in the first volume to the generated second volume.

2. The storage apparatus according to claim 1, wherein the processor is configured to:
acquire, for each of candidates in which the second volume is to be generated, operating ratios corresponding to a plurality of volumes already generated in a candidate;

calculate, for each of the candidates, the remaining operating ratio by subtracting a total of the acquired operating ratios from the operating ratio of the candidate.

3. The storage apparatus according to claim 2, wherein the processor is configured to select, from among the candidates, a candidate having a smallest remaining operating ratio as the second volume.

4. The storage apparatus according to claim 1, wherein the processor is configured to generate, in a case where the second volume is not possible to be generated from storage devices in an operating state, the second volume from storage devices in a non-operating state of the plurality of storage devices.

5. The storage apparatus according to claim 4, wherein the processor is configured to write, in a case where the plurality of storage devices only include the storage devices in the operating state, the data in the first volume to a free storage area in the plurality of storage devices.

6. The storage apparatus according to claim 1, wherein the required performance is obtained by multiplying, to a number of storage devices to which data is written through striping, the read-out throughput when the data is read out from the storage devices.

7. A data arrangement method executed by a processor in a storage apparatus, the storage apparatus including a plurality of storage devices that include a plurality of first storage devices that form a first volume, the data arrangement method comprising:

detecting that a failure storage device has occurred from among the plurality of first storage devices;
 acquiring an operating ratio for the first volume, the operating ratio indicating a percentage of storage devices operating simultaneously per unit time;
 acquiring a required performance indicating a read-out throughput of the plurality of first storage devices;
 extracting a plurality of second storage devices that has a remaining operating ratio which is equal to or more than the acquired operating ratio and satisfy the required performance, from the plurality of storage devices to generate a second volume to which the plurality of second storage devices belong; and
 moving data arranged in the first volume to the generated second volume.

8. A non-transitory computer-readable storage medium storing a program that causes a processor included in a computer to execute a process, the computer including a plurality of storage devices that include a plurality of first storage devices that form a first volume, the process comprising:

detecting that a failure storage device has occurred from among the plurality of first storage devices;
 acquiring an operating ratio for the first volume, the operating ratio indicating a percentage of storage devices operating simultaneously per unit time;
 acquiring a required performance indicating a read-out throughput of the plurality of first storage devices;
 extract a plurality of second storage devices that has a remaining operating ratio which is equal to or more than the acquired operating ratio and satisfy the required performance, from the plurality of storage devices to generate a second volume to which the plurality of second storage devices belong; and
 moving data arranged in the first volume to the generated second volume.

9. The storage apparatus according to claim 3, wherein the processor is configured to:

identify a number of storage devices that meet the required performance after selecting the candidate, and
 generate the second volume by using the plurality of second storage devices corresponding to the identified number of storage devices included in the selected candidate.

* * * * *